UNITED STATES PATENT OFFICE.

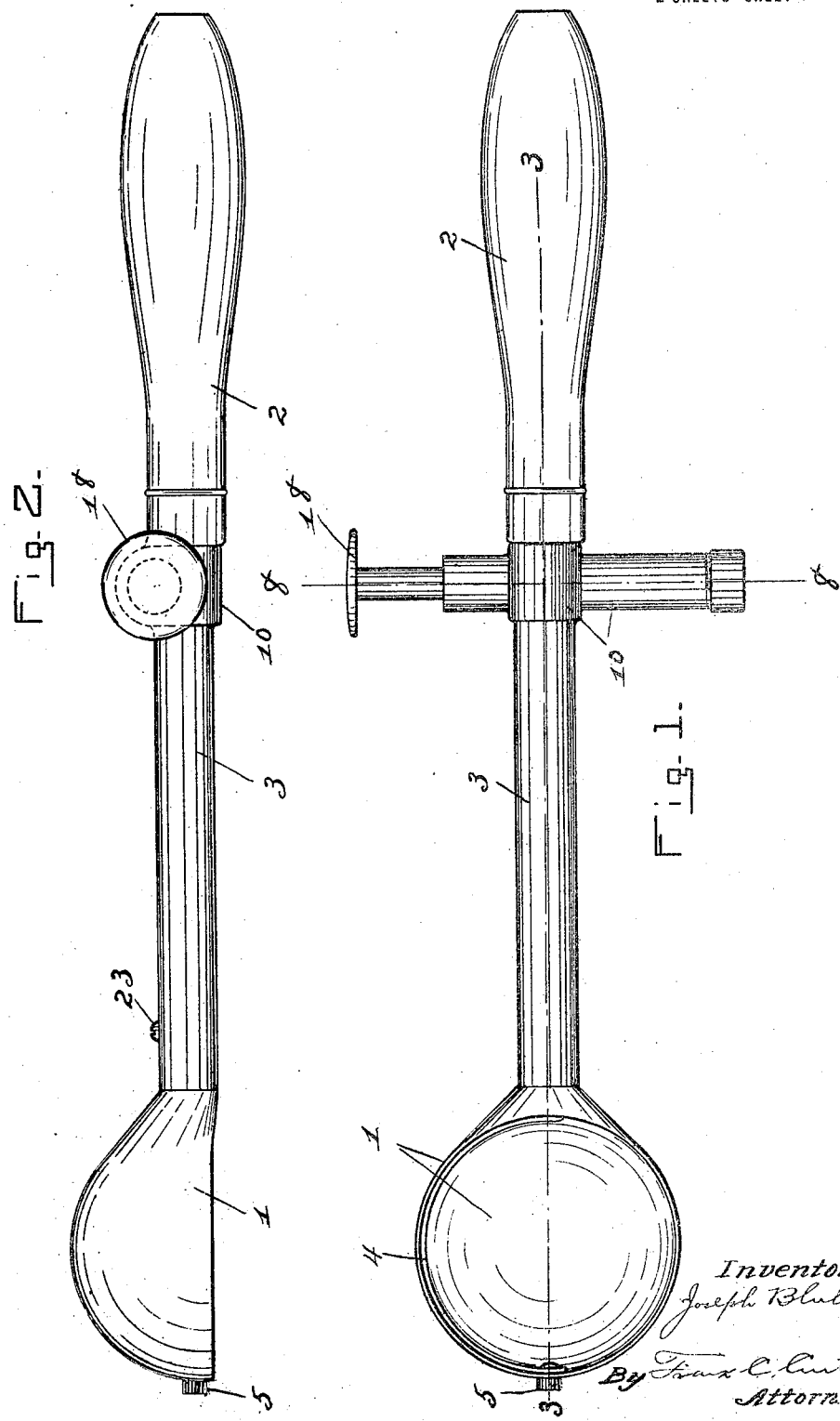

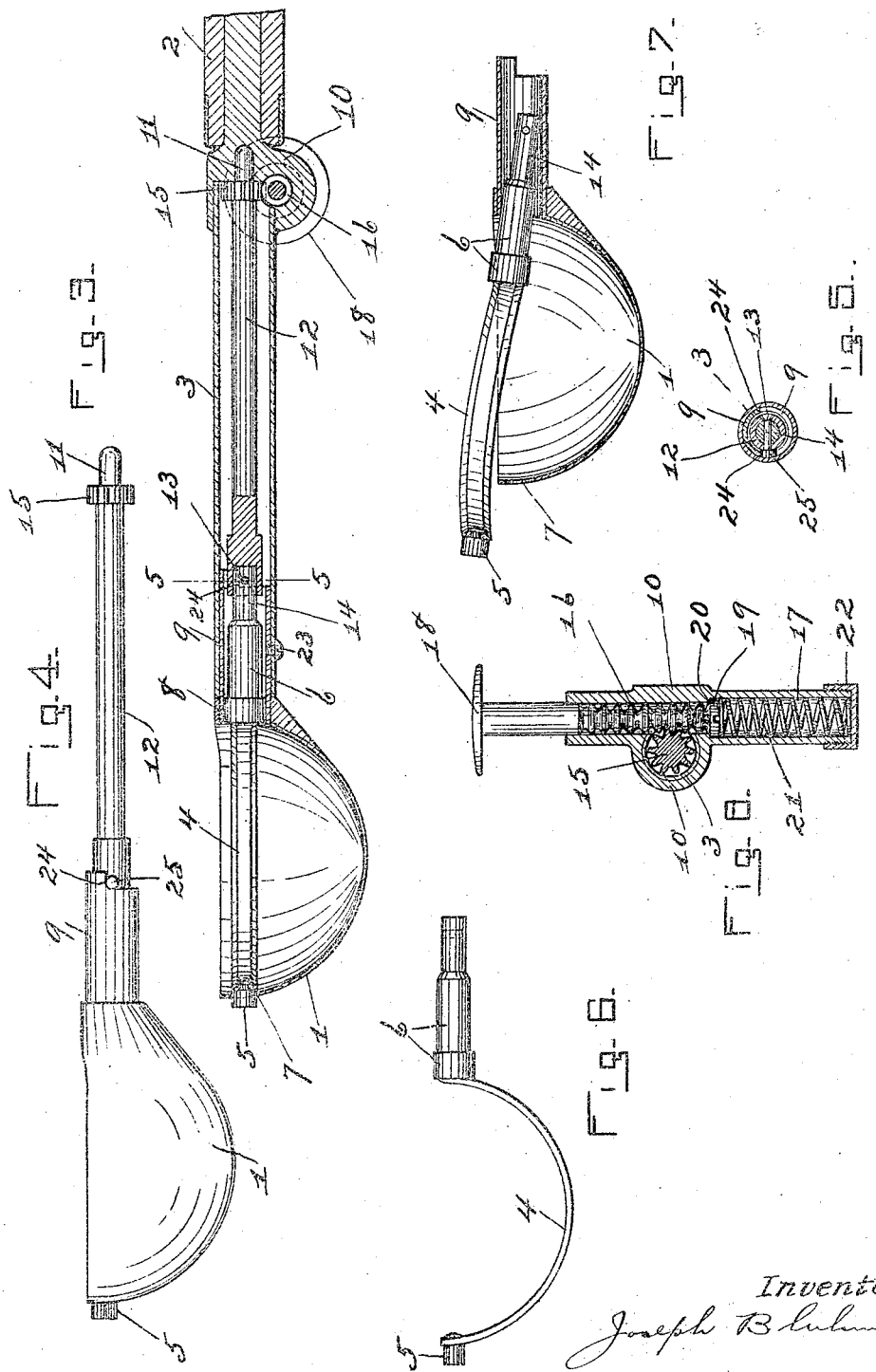

JOSEPH BLUHM, OF TROY, NEW YORK, ASSIGNOR TO THE DANA MANUFACTURING CORPORATION, OF TROY, NEW YORK, A CORPORATION OF NEW YORK.

ICE-CREAM SPOON.

1,246,032. Specification of Letters Patent. Patented Nov. 6, 1917.

Application filed March 14, 1916. Serial No. 84,219.

*To all whom it may concern:*

Be it known that I, JOSEPH BLUHM, a citizen of the United States, residing at Troy, county of Rensselaer, and State of New York, have invented certain new and useful Improvements in Ice-Cream Spoons, of which the following is a specification.

Reference may be had to the accompanying drawings, and the reference characters marked thereon which form a part of this specification. Similar characters refer to similar parts in the several figures therein.

This invention relates to ice-cream spoons, dishers and similar dispensing scoop-devices for serving measured quantities of plastic material, and having rotatively movable cutters or scrapers for freeing the plastic material from the bowl, cup or scoop.

The principal objects of the invention are to provide a simple and efficient operating mechanism for the movable cutter or scraper; to conceal from view and protect from contact with the plastic material substantially all of the operating mechanism for moving the cutter or scraper, and to provide for a more convenient movement of the thumb-piece of the operating mechanism.

Other objects will appear in connection with the following description.

Figure 1 of the drawings is a bottom plan view of an ice-cream spoon embodying my invention.

Fig. 2 is a view in side elevation of the same.

Fig. 3 is a vertical longitudinal section taken centrally through the bowl and handle on the broken line 3—3 in Fig. 1.

Fig. 4 is a view in side elevation of the bowl with its contained scraper and the scraper-operating shaft and pinion, withdrawn from the tubular shank of the handle.

Fig. 5 is a vertical cross-section taken through the shank of the handle on the broken line 5—5 in Fig. 3.

Fig. 6 is a view in side elevation of the scraper and its trunnions before the scraper is inserted within the bowl.

Fig. 7 is a sectional view, similar to Fig. 3, of the bowl and its tubular shank, showing the manner in which the scraper is inserted within the bowl.

Fig. 8 is a vertical cross-section taken through the housing, 4, the pinion, and the thumb-operated rack-bar on the broken line 8—8 in Fig. 1.

Referring to the drawings wherein the invention is shown in preferred form, applied to an ice-cream spoon, 1 is the bowl, which, in this form of the invention, is semispherical in form and is mounted upon a handle having a grasp, 2, and a tubular shank, 3.

The semicircular scraper, 4, conforms to the interior of the bowl and has projecting oppositely from its respective ends trunnions, 5 and 6, whereby the scraper is rotatively mounted coaxially with the shank, 3, of the handle.

The trunnion, 5, on the outer end of the scraper is rotatively mounted in a bearing formed by a circular aperture, 7, in the wall of the bowl, and the trunnion, 6, is rotatively mounted in a bearing at 8, in a tubular shank, 9, integral with, or in rigid relation to, the bowl.

The tubular bowl-shank, 9, is adapted for telescopic connection with the tubular shank, 3, of the handle.

Upon the outer end of the tubular shank, 3, of the handle is fixed a housing, 10, extending crosswise of the shank of the handle adjacent to the grasp, 2, which housing contains a bearing, 11, for one end of the scraper-operating shaft, 12, the other end of which is permanently secured by a rivet, 13, to a reduced end, 14, of the scraper trunnion, 6, whereby rotative movement of the shaft, 12, is imparted to the scraper.

The shaft, 12, has fixed thereupon adjacent to the bearing, 11, a pinion, 15, adapted to be engaged by a toothed rack-bar, 16, reciprocatory longitudinally within a chamber, 17, in the housing, 10, and guided therein.

The outer end of the rack-bar projects from the housing and is provided with a head or thumb-piece, 18, whereby the rack-bar can be conveniently forced inward by pressure of the thumb of the same hand by which the grasp, 2, of the handle is held.

The outward movement of the rack-bar is limited by engagement of a screw-head, 19, with a shoulder, 20, on the housing, 10.

The rack-bar is yieldingly held at the limit at its outward movement by a coil-spring, 21, confined between the screw-head, 19, and a cap, 22, on the adjacent end of the housing, 10.

The handle-shank, 3, is preferably detachably secured upon the bowl-shank, 9, by means of a screw, 23, by removal of which screw telescopic separation of the handle-shank from the bowl-shank is permitted, to withdraw from the handle-shank the shaft, 12, and pinion, 15, as shown in Fig. 4.

The end of the bowl-shank, 9, is partly cut away to form shoulders, 24, in the path of a head, 25, on the rivet, 13, whereby rotative movement of the scraper and scraper-shaft is limited in both directions so that the scraper is confined in its movement to the space within the bowl.

The relative dimensions of the scraper-trunnion, 6, with its reduced end, 14, and the bowl-shank, 9, are such that the trunnion, 6, can be inserted from within the bowl through the bowl-shank, 9, in the manner shown in Fig. 7; and after the trunnion, 8, has been so inserted, the trunnions, 5, can be sprung into its bearing, 7.

After the scraper-trunnions have been thus inserted in their bearings, the shaft, 12, is riveted to the reduced end, 14, of trunnion, 8, thereby retaining the scraper permanently mounted within the bowl.

I prefer to make the rack-bar circular in cross-section and to have its several teeth extend circumferentially of the bar, as shown, whereby the position of the bar will be constantly changing rotatively in use, thus distributing the wear to different parts of the teeth.

While I have used the term bowl as applied to a semispherical scoop, I wish it to be understood that I consider the various known forms of cup or scoop used for a similar purpose as the equivalent of the bowl shown; and my improved operating mechanism can be readily adapted for use with cutters or scrapers corresponding with the form of bowl, cup or scoop employed.

The invention is not to be understood as restricted to the details set forth since these may be modfied by the skilled mechanic within the scope of the appended claims without departing from the spirit and scope of the invention.

What I claim as new and desire to secure by Letters Patent is:

1. A device of the class described having in combination a bowl; a movable scraper for the bowl; a handle; a housing extending crosswise of the handle; a toothed rack-bar reciprocatory within the housing and having an exteriorly-located thumb-piece; a spring for imparting a return movement to the rack-bar; and a scraper-operating shaft having a pinion in engagement with the rack-bar, said housing having means independent of said pinion for guiding said rack-bar in its reciprocating movement.

2. A device of the class described having in combination a bowl; a movable scraper for the bowl; a handle; a housing extending crosswise of the handle; a toothed rack-bar reciprocatory within the housing and having an exteriorly-located thumb-piece; a spring within the housing for imparting a return movement to the rack-bar; and scraper-actuating mechanism including a rotatory shaft having a pinion engaged by said toothed rack, said housing having means independent of said pinion for guiding said rack-bar in rectilinear reciprocating movement.

3. A device of the class described having in combination a bowl; a movable scraper for the bowl; a handle; a housing extending crosswise of the handle; a toothed rack-bar reciprocatory within the housing and having an exteriorly-located thumb-piece; a coil-spring confined under compression in engagement with the inner end of the rack-bar; and a scraper-actuating shaft having a bearing in the housing and a pinion in engagement with the toothed rack, said housing having slideway-bearings for said rack-bar on opposite sides of said pinion.

4. A device of the class described having in combination a bowl; a movable scraper for the bowl; a handle; a housing extending crosswise of the handle; a toothed rack-bar reciprocatory within the housing and having an exteriorly-located thumb-piece, said rack-bar being circular in cross-section and free for rotative movement and having its several teeth extending circumferentially of the bar; a spring within the housing for imparting a return movement to the rack-bar; and a scraper-operating shaft having a pinion in engagement with said toothed rack.

5. A device of the class described having in combination a bowl having a tubular shank; a movable scraper for the bowl; a handle having a grasp, and a separable tubular shank adapted for telescopic engagement with the tubular shank of the bowl, releasable means for holding said tubular shanks in telescoped engagement; an operating member movably mounted upon the handle adjacent to the grasp and having a thumb-piece; and scraper-operating means extending through the tubular shanks of the bowl and of the handle and actuated by said operating member.

6. A device of the class described having in combination a bowl having a tubular shank; a movable scraper for the bowl; a handle having a grasp, and a separable tubular shank adapted for telescopic engagement with the tubular shank of the bowl; releasable means for holding said shanks in telescoped engagement; a housing extending crosswise of the handle adjacent to the grasp; a toothed rack-bar reciprocatory within the housing and having an exteriorly-located thumb-piece; and a scraper-actuating shaft extending through the tubular shank of the handle and having a pinion in engagement with the toothed rack.

7. A device of the class described having in combination a bowl; a movable scraper for the bowl; a handle having a grasp and a tubular shank; a housing extending crosswise of the handle adjacent to the grasp; a toothed rack-bar reciprocatory within the housing and having an exteriorly-located thumb-piece; a spring within the housing for imparting a return movement to the rack-bar; and a scraper-operating shaft extending through the tubular shank of the handle and having a pinion in engagement with the toothed rack, said housing and said tubular shank merging to inclose said pinion and the toothed portion of said rack.

8. A device of the class described having in combination a bowl; a movable scraper for the bowl; a handle having a grasp and a tubular shank; a housing extending crosswise of the handle adjacent to the grasp; a toothed rack-bar reciprocatory within the housing and having an exteriorly-located thumb-piece; a coil-spring confined under compression within the housing in engagement with the inner end of the rack-bar; and a scraper-operating shaft extending through the tubular shank of the handle and having a pinion in engagement with said toothed rack, the inner end of said shaft having a bearing in the housing, said housing and said tubular shank merging to inclose said pinion and the toothed portion of said rack.

9. A device of the class described having in combination a bowl having a tubular shank; a movable scraper for the bowl; a handle having a grasp, and a tubular shank adapted for separable telescopic engagement with the tubular shank of the bowl; a detachable connection for securing the tubular shank of the handle in telescoped relation to the tubular shank of the bowl; an operating member movably mounted on the handle adjacent to the grasp and having a thumb-piece; a scraper-operating shaft extending through the tubular shanks of the bowl and of the handle; and separable operating-connections between said shaft and the operating member on the handle, permitting the shaft to be withdrawn from the tubular shank of the handle when the latter is separated from the tubular shank of the bowl.

10. A device of the class described having in combination a bowl having a tubular shank; a movable scraper for the bowl; a handle having a grasp, and a tubular shank adapted for separable telescopic engagement with the tubular shank of the bowl; a detachable connection for securing the tubular shank of the handle in telescoped relation to the tubular shank of the bowl; a housing extending crosswise of the handle adjacent to the grasp, having a shaft-bearing opening into the tubular shank of the handle centrally thereof; a toothed rack-bar reciprocatory within the housing and having an exteriorly-located thumb-piece; a coil-spring confined within the housing in engagement with the inner end of the toothed rack-bar; and a scraper-operating shaft extending through the tubular shanks of the bowl and of the handle, having a pinion in removable engagement with the toothed rack-bar, the inner end of said shaft occupying said bearing in the housing, said shaft being withdrawable from said bearing, and its pinion withdrawable from engagement with said rack-bar by separation of the tubular shank of the handle from the tubular shank of the bowl.

11. A device of the class described having in combination a bowl; a movable scraper for the bowl rotatively mounted on an axis extending transversely of the bowl; a handle having a grasp, and a tubular shank detachably connected to the bowl; scraper-operating mechanism, including a thumb-actuated member adjacent to the grasp of the handle; and means independent of said handle and thumb-actuated member for limiting the movement of the scraper to the space within the bowl.

12. A device of the class described having in combination a bowl; a movable scraper for the bowl rotatively mounted on an axis extending transversely of the bowl; a handle having a grasp, and a tubular shank detachably connected to the bowl; scraper-operating mechanism including a thumb-actuated member adjacent to the grasp of the handle; and means in permanent fixed relation to the bowl for limiting the movement of the scraper to the space within the bowl.

13. In a dispensing dipper, the combination with a cup; a handle; and a frame extending therebetween; of a scraper operable in said cup; a tubular element mounted on said frame adjacent to and at right angles with said handle; a cylindrical plunger operable in said tubular element; a plurality of rings on said plunger; a rod rigidly engaged with said scraper at one end and entering said tubular element at the other; a pinion on said rod engageable with said rings; means for manually actuating said plunger; and means in said tubular element adapted to press said plunger normally outward.

In testimony whereof, I have hereunto set my hand this 11th day of March, 1916.

JOSEPH BLUHM.

Copies of this patent may be obtained for five cents each, by addressing the "Commissioner of Patents, Washington, D. C."